INVENTOR.
NORMAN R. HAINES
BY
*Whittemore, Hulbert & Belknap*
ATTORNEYS 3,342,191
UNDER TRUCK WASHER
Norman R. Haines, Ann Arbor, Mich., assignor to Canomac Corporation, Ann Arbor, Mich., a corporation of Michigan
Filed June 1, 1965, Ser. No. 460,038
1 Claim. (Cl. 134—45)

This invention relates to vehicle washing apparatus and refers more particularly to an under truck washer.

An essential object of the invention is to provide vehicle washing apparatus having means for concentrating a strong spray upon the lower portions of a vehicle. The spray means is designed to remove the accumulation of dirt and mud from the wheels and the under frame of the vehicle.

Another object is to provide vehicle washing apparatus comprising a horizontal spray pipe mounted adjacent the floor and having upwardly directed nozzles.

Another object is to provide vehicle washing apparatus having vertical spray pipes extending upwardly from the opposite ends of the horizontal pipe.

Another object is to provide a tube of heavy wall construction surrounding the horizontal pipe, which tube is sufficiently strong to withstand the weight of a vehicle driven over it without collapsing and which has ports in its top wall aligned with the nozzles.

Another object is to provide the tube as a means of protecting the nozzles from external damage.

Another object is to provide means for supplying liquid under pressure to the pipes, with control means for operating the liquid supply means in response to the movement of a vehicle past the pipes.

Another object is to provide means for starting the supply of liquid when the leading end of the vehicle approaches the pipes, with means for stopping the supply when substantially the full length of the vehicle has past the pipes.

Other objects and features of the invention will become apparent as the description proceeds, especially when taken in conjunction with the accompanying drawings, wherein.

Referring now more particularly to the drawings, the under truck washer of this invention is designed for use with a vehicle washing apparatus of the type disclosed in my prior United States Patent No. 3,088,472. Such washing apparatus is shown in detail in my prior patent and is therefore only briefly described in this application.

Figure 1:
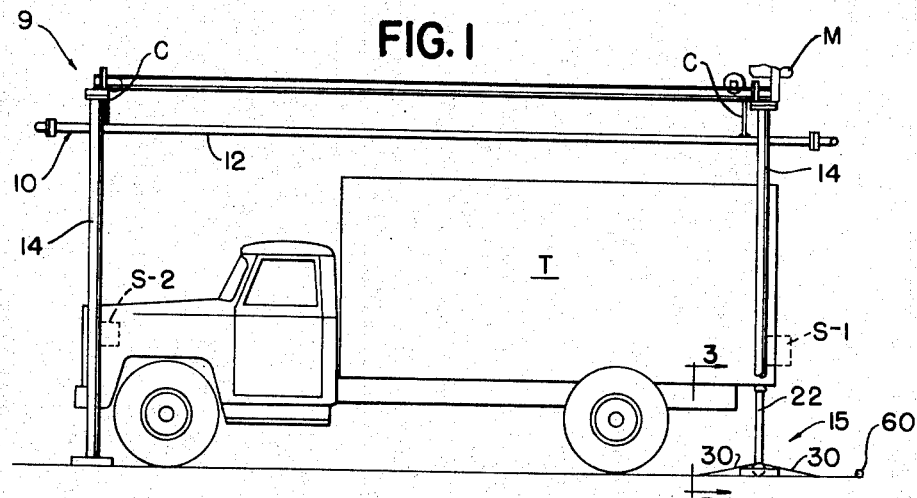
FIGURE 1 is a side elevational view of the apparatus embodying my invention.

Referring particularly to FIGURE 1, the vehicle washing apparatus with which my under truck washer is associated is indicated generally at A and comprises a horizontal, rectangular spray frame 10 which is long enough and wide enough to completely surround a vehicle such as the vehicle T shown in FIGURE 1. The spray frame 10 is formed of water pipes 12 having horizontally inwardly directed nozzles to spray the vehicle it surrounds. One long pipe 12 is shown in FIGURE 1, and will pass along the side of the vehicle T nearest the viewer when the spray frame is lowered. The other long pipe 12 of the spray frame will pass along the opposite or remote side of the vehicle and the two end pipes will pass along the front and rear when the spray frame is lowered.

The spray frame 10 is supported on a suitable rigid support structure comprising four corner posts 14 located just outside the four corners of the vehicle, these ports being rigidly anchored to the floor. The spray frame is moved up and down inside these posts by a motor M on the top of the support structure by means of cables C.

Figure 2:
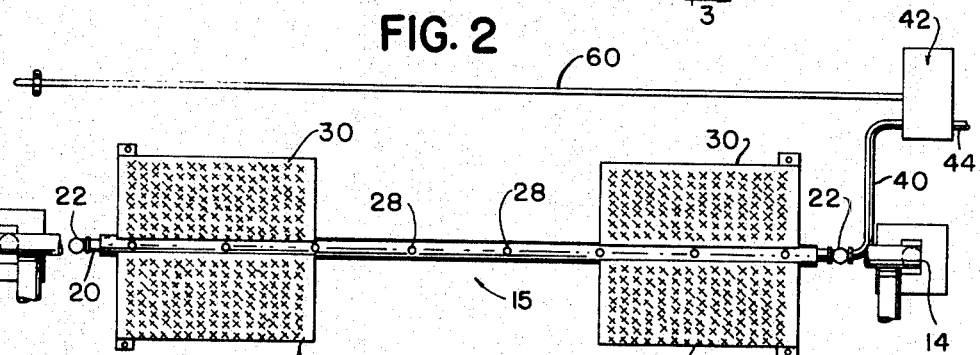
FIGURE 2 is a fragmentary plan view with portions broken away in the interest of clarity.
Figure 3:
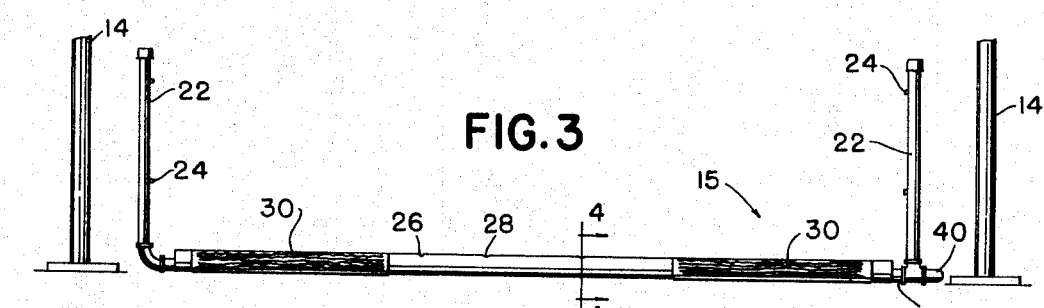
FIGURE 3 is a fragmentary view taken substantially on the line 3—3 of FIGURE 1.

The under truck washer 15 is designed to wash or rinse away the accumulated mud and dirt on the lower portions of the vehicle, particularly the wheels and under-frame. The under truck washer includes a horizontal spray pipe 20 at the rear end of the washing apparatus 10 and extending transversely thereof. As seen in FIGURE 2, the pipe 20 lays on the ground and extends substantially on a line between the two rear corner posts 14. A pair of vertically upwardly extending spray pipes 22 are joined to the ends of the horizontal spray pipe 20. The pipes 22 extend up to about the level of the tops of the vehicle wheels in order to spray the wheels as well as the under-frame and generally the lower portions of the vehicle.

Nozzles 24 are provided on the pipes, being spaced lengthwise thereof. The nozzles on the horizontal pipe extend vertically upwardly and the nozzles on the vertical pipes extend horizontally inwardly.

A tube 26 of considerably larger diameter than the horizontal pipe 20 surrounds the horizontal pipe for substantially its full length. Tube 26 has openings or ports 28 in its top wall aligned with the respective nozzles 24 in the horizontal spray pipe 20. The upper ends of nozzles 24 do not extend above or beyond the top wall of tube 26. They may extend flush with the top wall, but preferably terminate slightly below it. The main purpose of the tube 26 is to protect the pipe 20, as well as nozzles 24, from the weight of the vehicle when it passes over. The tube 26 is of sufficiently heavy wall construction to withstand the weight of large trucks and buses.

Preferably tread plates 30 are employed to ease the movement of the vehicle over the tube 26. These plates have their adjacent edges resting on the top wall of the tube 26 and their remote edges resting on the ground to provide a ramp for each wheel of the vehicle. The adjacent edges of the tread plates may be permanently secured as by welding to the top wall of tube 26, or the adjacent edges of the tread plates may be connected to each other to prevent them from slipping off the tube 26.

Water is supplied to the pipes 20 and 22 through the hose 40. A control device 42 is provided including a valve for opening and closing the flow to hose 40 from hose 44.

Figure 5:
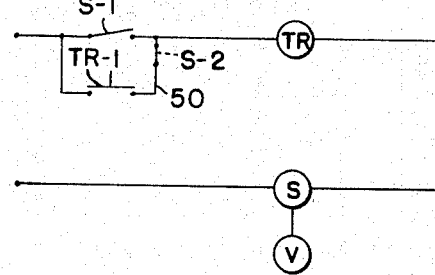
FIGURE 5 is a wiring diagram.
Figure 4:
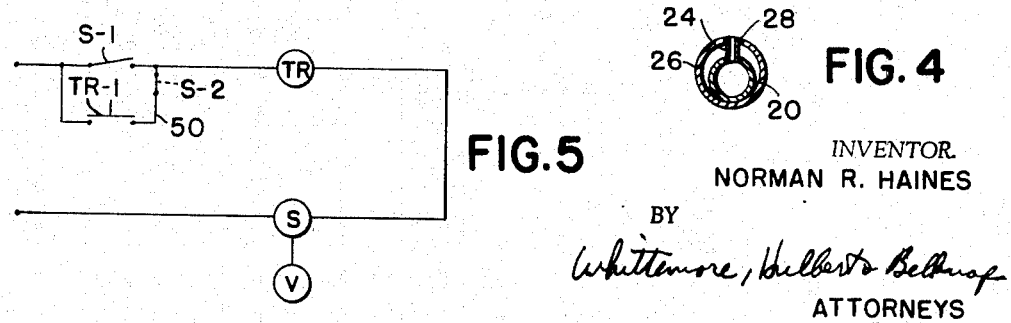
FIGURE 4 is a sectional view on the line 4—4 of FIGURE 3.

Referring to FIGURE 5, the valve for opening and closing the water line is designated V and is operated by a solenoid S. The solenoid S is in a circuit which includes switch S–1, a timer relay TR and a normally open timer relay contact TR–1 in a circuit 50 around switch S–1. Switch S–1 is normally open so that solenoid S is de-energized and valve V is closed. The switch S–1 is located at the rear of the washing apparatus and may be closed by the approach of the truck into the position shown in FIGURE 1. As the truck moves from right to left to the FIGURE 1 position, it passes over the tube 60 shown lying on the ground in advance of the washing apparatus, to momentarily close switch S–1. This may be a tube similar to the type used in gas stations to signal the presence of a customer at one of the pumps. Alternatively, the switch S–1 may be mounted on one of the posts 14, as shown in dotted lines in FIGURE 1, to be contacted by the approaching vehicle and thereby momentarily closed.

When switch S–1 is closed in response to the approach of a vehicle toward the washing apparatus from the right, the timer relay TR is energized closing the contact TR–1 around switch S–1, so that the circuit to the solenoid S will remain closed after the vehicle passes the switch S–1. The timer relay is set to remain closed for a predetermined time interval, and preferably the timer is adjustable so that the time interval can be varied to suit the wishes of the operator. When the solenoid S is energized it opens valve V to admit water under pressure to the spray pipes 20 and 22. Nozzles along the horizontal pipe direct strong jets or sprays of water against the under surfaces of the vehicle and the nozzles 24 along the vertical pipes direct strong jets or sprays of water against the lower side portions of the vehicle.

The timing should be such that the vehicle can be moved slowly from the right into the FIGURE 1 position where it is in position to be washed thoroughly by the vertically movable spray frame 10. Then the timer relay TR will time-out to open the circuit to solenoid S closing valve V and discontinuing operation of the under truck washer.

As an alternative, relay TR may be a simple relay which will close the circuit and hold the same closed indefinitely by its contact TR–1, and a second switch S–2 may be employed at the front end portion of the washing apparatus. This switch S–2 is shown in dotted lines in FIGURE 1 and would be engaged and operated by the front end of the vehicle. The switch S–2 would be a normally closed switch and would be placed in the circuit 50, and would open in response to contact by the front end of the vehicle to open the circuit and deenergize the solenoid to shut off the under truck washer. The switch S–2 is shown dotted in FIGURE 5. It of course will not be employed if the relay is a timer relay.

What I claim as my invention is:

Vehicle washing apparatus comprising a vertically moving spray frame, means for spraying the lower portions of a vehicle during the time it is moved along a predetermined path into operative position with respect to said spray frame comprising a generally U-shaped pipe frame, said pipe frame including an elongated horizontal spray pipe adjacent the floor near one end of said spray frame and extending transversely of said path, said horizontal spray pipe being of a length greater than the width of the vehicles to be washed and adapted to be passed over by such vehicles moving along said path, upwardly extending nozzles on said spray pipe spaced longitudinally thereof, an elongated support tube having an inside diameter greater than the outside diameter of said horizontal spray pipe, said horizontal spray pipe extending lengthwise within said support tube, said horizontal spray pipe and support tube being substantially coextensive with one another, said support tube resting upon the floor and being of heavy-wall construction sufficiently strong to withstand the weight of such vehicles driven over it without collapsing, said support tube having ports in its top wall spaced lengthwise thereof and aligned with said nozzles to permit liquid from said nozzles to be sprayed on such vehicles, said nozzles extending into said ports but not extending above said top wall of said support tube so as to be protected thereby, said pipe frame also including elongated vertical spray pipes connected to the ends of said horizontal pipe and extending upwardly therefrom, nozzles on said vertical pipes spaced longitudinally thereof and directed inwardly, means for supplying liquid under pressure to said pipes to be discharged from said nozzles upon the lower portions of the vehicle, means for automatically starting said supply means when the leading end of the vehicle is adjacent said pipes during movement of said vehicle along said path toward said operative position with respect to said spray frame, and means for discontinuing the operation of said supply means after arrival of said vehicle at said operative position.

References Cited

UNITED STATES PATENTS

| | | | |
|---|---|---|---|
| 1,614,213 | 1/1927 | Smith | 134—123 |
| 2,751,915 | 6/1956 | Roberts | 134—123 |
| 2,752,925 | 7/1956 | Friers | 134—123 |
| 3,024,795 | 3/1962 | Roller et al. | 134—199 X |
| 3,088,472 | 5/1963 | Haines | 134—199 X |

FOREIGN PATENTS 828,273  2/1960  Great Britain.

CHARLES A. WILLMUTH, *Primary Examiner.*

R. L. BLEUTGE, *Assistant Examiner.*